United States Patent [19]

Dinsmore

[11] Patent Number: 4,539,710

[45] Date of Patent: Sep. 3, 1985

[54] DIVERSITY TELEMETRY RECEIVER HAVING PLURAL SPACED ANTENNAS

[75] Inventor: Mark T. Dinsmore, Newton, Mass.

[73] Assignee: Transkinetics Systems, Inc., Canton, Mass.

[21] Appl. No.: 537,488

[22] Filed: Sep. 30, 1983

[51] Int. Cl.³ .......................... H04B 7/08; H04B 1/16
[52] U.S. Cl. ................................... 455/134; 455/141; 340/870.41
[58] Field of Search ..................... 455/52, 132–141, 455/277, 278; 340/870.41

[56] References Cited

U.S. PATENT DOCUMENTS

| 2,494,309 | 1/1950 | Peterson et al. | 455/134 |
| 3,383,599 | 5/1968 | Miyagi | 455/141 |
| 3,902,119 | 8/1975 | Skingley | 455/137 |
| 3,916,316 | 10/1975 | Hearn et al. | 455/134 |
| 4,403,343 | 9/1983 | Hamada | 455/134 |

*Primary Examiner*—Jin F. Ng
*Attorney, Agent, or Firm*—Weingarten, Schurgin, Gagnebin & Hayes

[57] ABSTRACT

A diversity telemetry receiver having plural spaced antennas includes a plurality of RF FM receiving channels each associated with an antenna, and each comprising one or more RF amplification stages, a mixer stage, and one or more IF stages along with an analog circuit providing a plurality of control signals that represent the relative signal level of the associated channel, an FM detector, and a signal level responsive switch operative to selectively apply the IF signal from the channel having the strongest signal level to the FM detector. The output of the FM detector which forms the system output is free of switching transients due to the operation of the level responsive switch prior to FM detection. A data recorder may be connected to receive the FM detector output, and a display may be connected to the level responsive switch to provide a visual indication of the channel having the strongest signal. The diversity telemetry receiver having plural spaced antennas is advantageously employed in biomedical applications requiring interference-free reception of physiological telemetry from both human and nonhuman subjects in motion.

11 Claims, 2 Drawing Figures

DIVERSITY TELEMETRY RECEIVER HAVING PLURAL SPACED ANTENNAS

FIELD OF THE INVENTION

The invention is directed to the field of radio communications, and more particularly, to a novel diversity telemetry receiver having plural spaced antennas.

BACKGROUND OF THE INVENTION

Radio waves which propagate through the atmosphere typically have regions of relatively low signal strength resulting from destructive interference, shielding, etc. In many applications calling for the reliable transmission and reception of physiological telemetry such as ECG, EEG, and EMG data of human and non-human subjects, such dead spots present a possibility of an intolerable loss of valuable diagnostic and research data. Where the source is fixed, it is a relatively easy job to avoid placing the receiving antenna in a dead spot. With moving sources, as are found in telemetry of physiological data from ambulatory subjects, the appearance of a dead spot at the receiving site from time to time is almost a certainty.

It is known that if two or more receiving channels are sufficiently separated in space, the fading on the various channels is more or less independent. One known spatial diversity receiving system that makes use of this fact to maintain received signal level typically employs plural spaced-apart receiving antennas, receivers and detectors, and means operative in response to the signal-to-noise level of the radio frequency energy at each antenna to select the detected output from the channel having the strongest level. However, undesirable noise is produced in the selected output signal from switching-induced transients. In addition, in the case where each independent channel employs FM demodulation, different DC bias levels are commonly produced in the corresponding independent channels that introduces undesirable noise as the diversity receiver switches between the channels in dependence on the strength of the individual output signals therefrom.

SUMMARY OF THE INVENTION

The novel diversity receiver of the present invention includes a plurality of signal-receiving channels, each of which is associated with one of a plurality of spaced-apart antennas. Each channel is operative to provide radio frequency and intermediate frequency analog signals representative of the telemetry received by its associated antenna. A diversity switching network is coupled to the plural channels and is operative to provide corresponding control signals that represent the received signal strength of that channel. The switching network identifies the channel having the strongest signal and switches that channel's IF signal to an FM detector circuit. As the relative signal strengths shift with motion of the source, the switching network continues to select the strongest signal. The diversity receiver of the present invention substantially eliminates switching-induced transient noise at the detector output, since the channel switching function occurs at the intermediate frequency signals prior to FM detection. As a result, any transients introduced by the switching function are eliminated in the FM detection process. A common local oscillator is coupled to the RF mixer stages of plural channels insuring an identical intermediate frequency in all channel stages. This in turn provides the same DC bias in the detector output regardless of which channel is switched. As a result, no DC level shifts occur to the detector output from the operation of the switching network.

The control signals are provided by a high-speed analog circuit that includes a differential-input single-output operational amplifier for each channel. The non-inverting input to each operational amplifier receives a signal representative of the logarithm of the intermediate frequency signal of the associated channel. The output of each operational amplifier is applied through a diode to a common point from which each amplifier derives its noninverting input. In this manner, the output of the amplifier having the strongest input dominates and sets the feedback level for all the amplifiers. Only the amplifier with the strongest input can have a positive output, all the others being biased negative. The output of each amplifier controls a switch for the IF signal of the corresponding channel which controls the application of the IF signal to the FM detector. Since only the amplifier receiving the strongest input has a positive output, only the switch it controls conducts an IF signal to the FM detector. In this manner, a level priority selection of the strongest received signal is accomplished. A display may be connected to the switching network to identify the antenna having the strongest signal reception, and therewith identify the probable location of the telemetry source.

BRIEF DESCRIPTION OF THE DRAWING

These and other features and advantages of the present invention will become apparent as the invention becomes better understood by referring to the following exemplary and nonlimiting detailed description of the preferred embodiment, and to the drawings, wherein.

DETAILED DESCRIPTION OF THE PREFERRED EMBODIMENT

Figure 1:
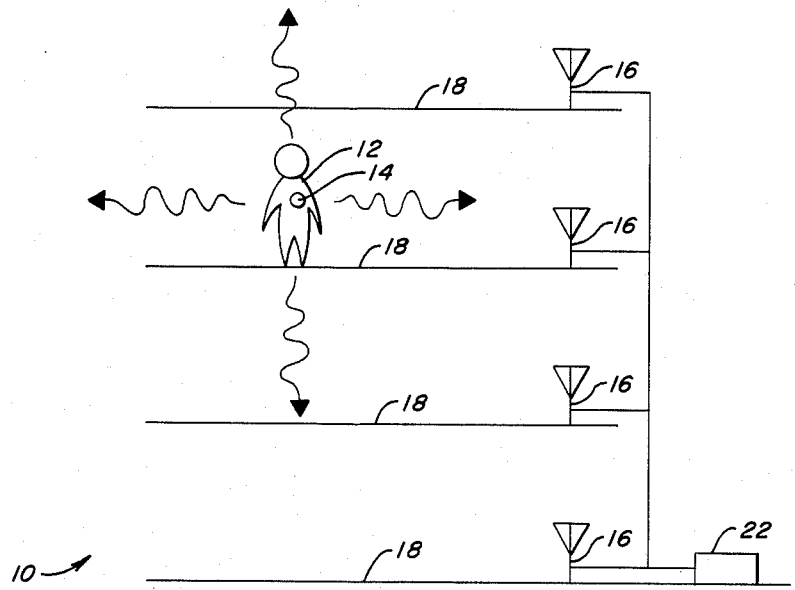
FIG. 1 is a pictorial view illustrating a typical application for the diversity telemetry receiver having plural spaced antennas of the present invention.

Referring now to FIG. 1, generally shown at 10 is a pictorial view illustrating a hospital environment where the novel diversity telemetry receiver having plural spaced antennas of the present invention has one exemplary utility. A patient 12 is provided with a small, lightweight, FM transmitter 14 connected, for example, to an ECG electrode positioned in well-known manner to detect and transmit the electrocardiographic activity of the heart. A plurality of antennas 16 are spaced apart on several floors 18 of the hospital. The actual number of antennas are selected to provide reception throughout the expected region of patient 12 travel.

The transmitter 14 preferably transmits FM ECG telemetry that is received at the plural antennas 16. A spatial diversity receiver 22 to be described is operative in response to the physiological telemetry received at the plural antennas to determine the antenna with the strongest reception, and to automatically connect the demodulated signal for that antenna alone to a data detector and recorder. The receiver 22 switches between antennas as the patient moves without causing output transients to ensure the uninterrupted reception of the telemetry. The diversity telemetry receiver having plural spaced antennas of the present invention may also advantageously be employed in other biomedical applications, such as sports medicine, critical patient care, and other areas where the secure reception of physiological telemetry from ambulatory or nonmoving human and animal subjects is highly desirable.

Figure 2:
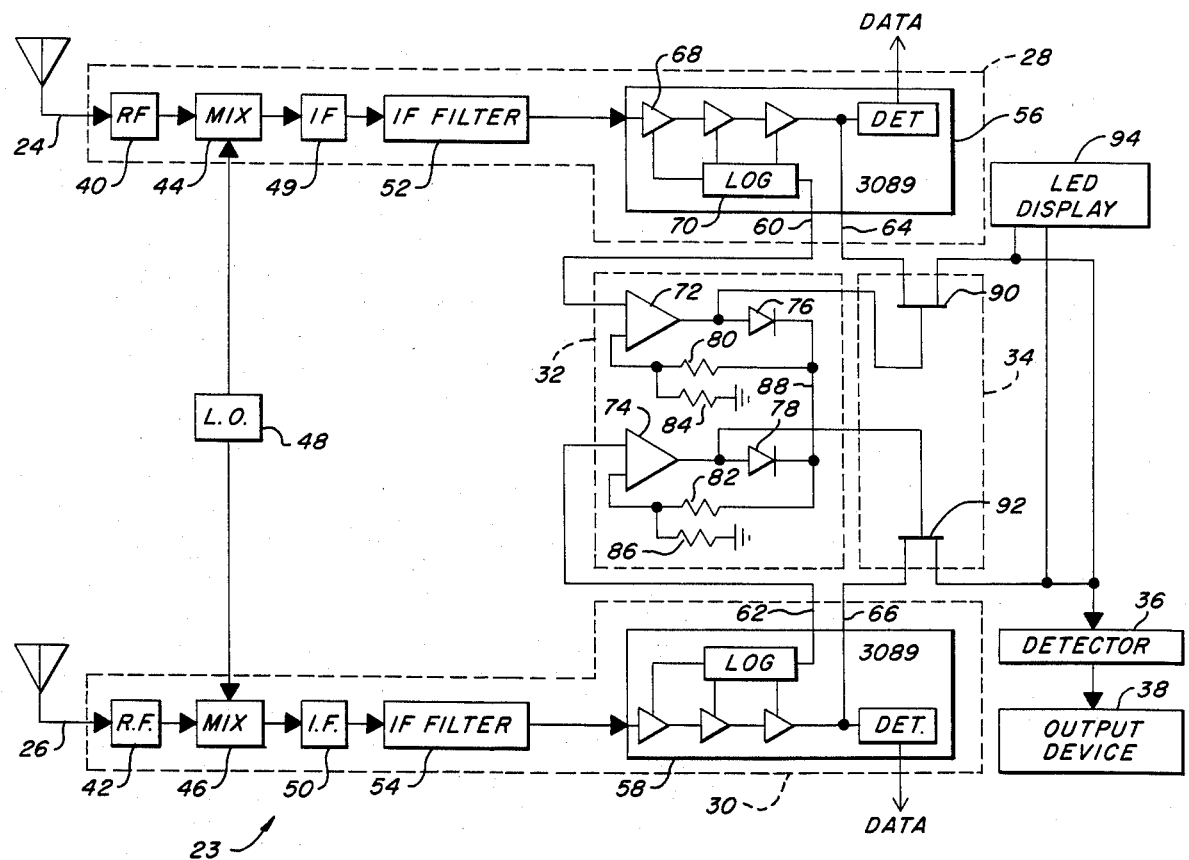
FIG. 2 is a schematic diagram of the diversity telemetry receiver having plural spaced antennas according to the present invention.

Referring now to FIG. 2, generally designated at 23 is a schematic diagram of a novel diversity telemetry receiver having plural spaced antennas according to the present invention. The receiver 23 includes a plurality of antennas 24, 26 in spaced-apart relation. Although two antennas are specifically illustrated, it will be appreciated that a greater number can readily be employed without departing from the inventive concept. Each antenna 24, 26 is connected to a receiving channel designated by a dashed box 28, 30. A diversity switch designated by dashed box 32 to be described is coupled to the plural channels, and is operative in response to the logarithm of the magnitude of the corresponding channel intermediate frequency (IF) signals to provide a like plurality of control signals, the magnitude of which denotes signal strength in the associated channel. An electronic switch designated by a dashed box 34 to be described is operative in response to the plurality of control signals to switch the IF signal in the channel having the strongest signal level to an FM detector 36, where the corresponding intermediate frequency signal is demodulated to baseband. A suitable output or recording mechanism 38 such as a magnetic tape is connected to the detector 36.

The channels 28, 30 are each operative to provide IF output signals representative of the transmitted telemetry received by the associated antenna. Each channel 28, 30 includes a radio frequency (RF) amplifier 40, 42 connected to the associated antenna 24, 26 for amplifying the RF analog signal received by the corresponding antenna. The amplified RF analog signals are connected to a mixer stage 44, 46 driven by a common local oscillator 48. The mixers 44, 46 are operative to convert the amplified RF signals to intermediate frequency (IF) signals of identical center frequencies. The common local oscillator 48 assures the uniformity of the intermediate frequency in the plural channels. The associated DC detection bias levels for each of the plural channels are accordingly the same, thereby substantially eliminating the noise introduced by differential DC bias levels resulting from FM detection later on in the circuitry.

The intermediate frequency analog electrical signals produced at the output of the mixers 44, 46 are amplified by intermediate frequency amplifiers 49, 50, and are connected to filters 52, 54 tuned to the intermediate frequency signal center frequency. The amplified and filtered IF signals are connected to conventional FM detectors 56,58.

The FM detectors 56, 58 respond to the IF signals to recover the physiological telemetry data from the frequency modulated (FM) IF signals. Each FM detector 56, 58 preferably consists of an FM receiver IF system, each having a tuning meter terminal 60, 62 and an IF signal terminal 64, 66, such as IC chip No. LM 3089, commercially available from National Semiconductor Corporation. The tuning meter terminals 60, 62 of the exemplary 3089 chip are produced by three on-chip amplifier and limiter stages, designated 68, that provide high-speed DC-coupled voltages having levels representative of the logarithm (log) of the input IF voltage, as designated by a box 70. Since individual ICs have different IF-voltage-to-tuning-meter outputs, adjustable gain and offset amplifiers, not shown, may be employed to match the electrical characteristics of the devices. The tuning meter outputs of the detectors 56, 58 are signals that have levels proportional to the S/N ratio of the transmitted RF telemetry, and as appears below, are used as the inputs for the diversity switch 32.

The diversity switch 32, preferably implemented as an analog switching network, includes a differential-input single-output operational amplifier (op-amp) 72, 74 associated with each channel. The noninverting input of each amplifier is connected to the IF log signal 60, 62 of the corresponding channel. The control signal output of each op-amp is connected to a diode 76, 78 so arranged as to permit only current flow out of the output of the associated operational amplifier. A voltage dividing network is provided that includes a negative feedback resistor 80, 82 connected between the corresponding output of the diodes 76, 78 and the inverting input of the associated operational amplifier, and a resistor 84, 86 connected between the inverting input terminal of its associated operational amplifier and electrical ground. A common bus 88 electrically connects the output of the several diodes 76, 78.

The electronic switching network 34 includes a gate-controlled switching FET 90, 92 for each channel. The inputs of the FETs 90, 92 are connected to corresponding IF outputs 64, 66 of the detectors 56, 58. The FM detector 36 is connected in common to the output of the FETs 90, 92. The gate of each of the FETs 90, 92 is connected to a corresponding one of the control signal outputs of the operational amplifiers 72, 74. The detector 36 preferably is, for example, a 3089 IC from National Semiconductor Corporation, with the several outputs of the switch network 34 connected to the IF terminal of the 3089 on-chip IF FM receiver.

In operation, the log output signals of the plural channels are applied to the corresponding noninverting inputs of the associated operational amplifiers. The operational amplifier associated with the channel having the highest IF log signal produces an amplified positive output control signal. Since the outputs of all of the diodes are connected to the common bus, the diode associated with the operational amplifier having the highest logarithmic IF signal level is biased in the conductive state, and the remaining diodes associated with the channels having weaker signal levels are biased in the nonconductive state. The voltage appearing on the common bus is the amplified positive voltage of the IF logarithmic signal having the highest level plus the voltage across the associated diode, and is fed back over the voltage divider network to the corresponding inverting inputs of the operational amplifiers. The gain of the operational amplifiers and the values of the resistors of the voltage divider are so selected that the voltage appearing on the inverting input terminals of the operational amplifiers is always greater than the corresponding logarithmic IF input voltage levels applied to the noninverting input terminals of the operational amplifiers associated with the channels not having the stongest signal. The operational amplifiers associated with the channels having the comparatively weaker log IF signals thereby tend to go more negative in order to reduce the voltage on the common bus. The reverse bias of the diodes associated with these operational amplifiers, however, blocks reverse current flow, which drives the high-gain amplifiers to their negative saturation voltage. Thus, each of the operational amplifiers produces a control signal at its output having an identifiable characteristic that denotes the strongest channel, as well as the weaker channels. The output of the op-amp associated with the strongest signal level produces a control signal having a positive voltage, while the outputs of the operational amplifiers associated with the comparatively weaker channels produce control signals having negative magnitudes. The FET whose gate has the positive control signal applied thereto is switched "on," while the remaining FETs remain in the "off" condition. The FET that corresponds to the strongest signal channel thereby automatically switches to the FM detector 36, which recovers the transmitted telemetry. When the relative signal levels of the various channels change, the same process is repeated and the analog diversity switch again switches to the channel having the greatest magnitude. The recorder output device thus maintains a continuous record of the transmitted physiological signals. Switching action occurs almost instantaneously with a change in the levels of the IF logarithmic signals, with switching speed limited only by the slew rate of the operational amplifiers. It will be appreciated that any number of channels can be readily employed without departing from the inventive concept.

The switching function occurs in the signal processing channels prior to FM detection on hard limited IF signals. As a result, little if any switching transients survive the FM detection process, insuring a demodulated output from detector 36 free of switching transients. Because the IF center frequencies are identical for all channels, the DC offset in the detector 36 output does not vary with channel switching, further avoiding output noise.

A display 94 may be connected to the several outputs of the switching network 34 which includes an LED associated with each of the channels. When an FET is triggered by the positive control signal, the associated LED is energized, providing a visual indication of the antenna whose signal is the strongest. In many cases, this antenna will be the one that is closest to the transmitter, thereby providing a ready indication of the location of the subject.

It will be appreciated that many modifications of the presently disclosed invention can be achieved without departing from the scope of the appended claims.

What is claimed is:

1. A diversity telemetry receiver for use with a plurality of spaced antennas, comprising:
   a plurality of channels, each responsive to RF FM modulated signals received at a corresponding one of said antennas;
   means connected to said plurality of channels for converting each RF signal into the corresponding IF signal;
   means coupled to said plurality of channels and operative in response to an associated one of said IF signals to provide a like plurality of signals each representative of the logarithm of a corresponding one of said IF signals;
   means coupled to said plurality of channels and operative in response to said signals each representative of the logarithm of a corresponding one of said IF signals to provide a like plurality of control signals each having an identifiable characteristic that denotes the relative strength of the corresponding channel;
   said control signal providing means including a like plurality of differential-input single-output operational amplifiers each having one input responsive to the logarithmic magnitude of the IF signal of an associated channel, a rectifying means connected to the output of a corresponding operational amplifier, a feedback circuit connected to the other input of an associated operational amplifier and to the output of the corresponding rectifying means, and a common bus connected to the output of the rectifying means;
   means for providing FM demodulation; and
   means coupled to said plurality of channels and operative in response to said plurality of control signals for applying the received signal for the channel having the strongest received signal to said demodulation means.

2. The invention of claim 1, wherein said rectifying means are diodes so arranged as to only conduct current out of the associated operational amplifier.

3. The invention of claim 1, wherein said control signal providing means includes a like plurality of electronic gate controlled switches each associated with one of said operational amplifiers, the gates of each of said switches connected to the output of a corresponding operational amplifier.

4. A diversity telemtry receiver for use with a plurality of spaced antennas, comprising:
   a plurality of FM receiving channels, each having a RF stage connected to a corresponding antenna, a mixer stage connected to the output of the corresponding RF stage, and an IF stage connected to the output of a corresponding one of said mixer stages;
   a local oscillator connected in common to each mixer stage of each of the channels for providing the same DC bias level in each of the channels;
   means connected to the IF stage of each of the channels having said common local oscillator for selecting the channel having the signal having the strongest magnitude;
   said selecting means includes a plurality of operational amplifiers having one input connected to a respective one of said IF stages of said plurality of channels, a diode connected to the output of the operational amplifier in each of the channels so arranged as to allow current only out of the associated operational amplifier, a common bus interconnecting the outputs of each of the diodes, and a voltage divider network including a resistor connected from the common bus to the other input of the operational amplifier in each channel;
   a discriminator device; and
   means coupled to the outputs of said operational amplifiers of said selecting means for automatically switching the IF stage of the channel having the strongest magnitude to said discriminator.

5. The invention of claim 4, further including means connected to each of said channels for producing a DC signal representative of the logarithm of the IF signal of the corresponding IF stage, and wherein said selecting means is responsive to said DC signal.

6. The invention of claim 4, wherein said switching means includes gate controlled electronic switches, with the gate of corresponding ones of said switches electrically connected to the output of an associated operational amplifier.

7. A diversity telemetry receiver for use with a plurality of spaced antennas, comprising:
- a plurality of channels each respectively associated with a corresponding antenna for receiving radio frequency energy incident on the associated antenna and for providing a corresponding intermediate frequency analog electrical signal; and
- means including an analog network responsive to the intermediate frequency signals of said plurality of channels for determining the channel having the strongest IF signal, said analog network including a plurality of differential-input single-output operational amplifiers, one input of each operational amplifier is connected to a corresponding one of said intermediate frequency electrical signals, a plurality of diodes each connected to the output of an associated operational amplifier so arranged as to allow only current flow out of the associated operational amplifier, a common bus connected to the output of said diodes, and a voltage divider network including a resistor associated with each operational amplifier connected in a negative feedback path between the common bus and the other input of an associated operational amplifier, and a plurality of resistors each connected between the other input of an associated operational amplifier and electrical ground.

8. The invention of claim 7, wherein said plurality of signal receiving channels are FM channels.

9. The invention of claim 8, further including an FM discriminator coupled to said analog network, and further including means coupled to said discriminator and to said determining means for switching the channel having the strongest signal to said discriminator.

10. The invention of claim 9, further including a data recorder connected to said FM discriminator.

11. The invention of claim 10, further including a display connected to said switching means operative to provide a visual indication of which of said antennas has the strongest signal.

* * * * *